(12) United States Patent
Volpe et al.

(10) Patent No.: US 6,895,475 B2
(45) Date of Patent: May 17, 2005

(54) PREFETCH BUFFER METHOD AND APPARATUS

(75) Inventors: Thomas A. Volpe, Austin, TX (US); Michael S. Allen, Austin, TX (US)

(73) Assignee: Analog Devices, Inc., Norwood, MA (US)

( * ) Notice: Subject to any disclaimer, the term of this patent is extended or adjusted under 35 U.S.C. 154(b) by 165 days.

(21) Appl. No.: 10/261,263

(22) Filed: Sep. 30, 2002

(65) Prior Publication Data

US 2004/0064649 A1 Apr. 1, 2004

(51) Int. Cl.[7] .............................................. G06F 12/08
(52) U.S. Cl. ...................................................... 711/137
(58) Field of Search ................................ 711/137, 168, 711/117, 122, 144

(56) References Cited

U.S. PATENT DOCUMENTS

| | | | | |
|---|---|---|---|---|
| 5,317,718 A | * | 5/1994 | Jouppi ......................... 711/137 |
| 5,420,994 A | * | 5/1995 | King et al. .................. 711/144 |
| 5,737,750 A | * | 4/1998 | Kumar et al. ................ 711/129 |
| 5,822,790 A | * | 10/1998 | Mehrotra .................... 711/213 |
| 5,835,929 A | | 11/1998 | Gaskins et al. |
| 5,854,911 A | | 12/1998 | Watkins |
| 5,860,096 A | * | 1/1999 | Undy et al. .................. 711/122 |
| 5,860,111 A | * | 1/1999 | Martinez et al. ............ 711/143 |
| 5,907,860 A | * | 5/1999 | Garibay et al. ............. 711/117 |
| 6,237,074 B1 | * | 5/2001 | Phillips et al. .............. 711/213 |
| 2003/0236949 A1 | * | 12/2003 | Henry et al. ................ 711/137 |

* cited by examiner

Primary Examiner—Hiep T. Nguyen
(74) Attorney, Agent, or Firm—Wolf, Greenfield & Sacks, P.C.

(57) ABSTRACT

Methods and apparatus are provided for supplying data to a processor in a digital processing system. The method includes holding data required by the processor in a cache memory, supplying data from the cache memory to the processor in response to processor requests, performing a cache line fill operation in response to a chache miss, supplying data from a prefetch buffer to the cache memory in response to the cache line fill operation, and speculatively loading data from a lower level memory to the prefetch buffer in response to the cache line fill operation.

36 Claims, 12 Drawing Sheets

|    | HW1 | $V_{d1}$ | $V_{p1}$ | HW0 | $V_{d0}$ | $V_{p0}$ |
|----|-----|----------|----------|-----|----------|----------|
| 00 |     |          |          |     |          |          |
| 04 |     |          |          |     |          |          |
| 08 |     |          |          |     |          |          |
| 0C |     |          |          |     |          |          |
| 10 |     |          |          |     |          |          |
| 14 |     |          |          |     |          |          |
| 18 |     |          |          |     |          |          |
| 1C |     |          |          |     |          |          |

FIG. 5

PREFETCH BUFFER METHOD AND APPARATUS

FIELD OF THE INVENTION

This invention relates to digital processing systems and, more particularly, to methods and apparatus for reducing average memory access time by utilizing a prefetch buffer.

BACKGROUND OF THE INVENTION

A digital signal computer, or digital signal processor (DSP), is a special purpose computer that is designed to optimize performance for digital signal processing applications, such as, for example, fast Fourier transforms, digital filters, image processing, signal processing in wireless systems, and speech recognition. Digital signal processor applications are typically characterized by real time operation, high interrupt rates and intensive numeric computations. In addition, digital signal processor applications tend to be intensive in memory access operations and to require the input and output of large quantities of data. Digital signal processor architectures are typically optimized for performing such computations efficiently.

Embedded processors may include a digital signal processor, a microcontroller and memory on a single chip. A complete system typically includes additional off-chip memory. Minimizing memory access times for high performance digital signal processors and microprocessors is critical in order to maximize processor performance. When the processor requires data or code from off-chip memory, the processor is stalled until the data can be read and returned. Synchronous dynamic random access memory (SDRAM) is widely used in high performance DSP and microprocessor systems, and the latency to read data from this type of memory can be very long.

Accordingly, there is a need for improved methods and apparatus for accessing memory with reduced average access times.

SUMMARY OF THE INVENTION

According to a first aspect of the invention, a digital processing system is provided. The digital processing system comprises a processor for executing instructions, a cache memory system, including a cache memory, for holding data required by the processor and for performing a cache line fill operation in response to a cache miss, a prefetch buffer, and control logic for supplying data from the prefetch buffer to the cache memory in response to the cache line fill operation and for speculatively loading data from a lower level memory to the prefetch buffer in response to the cache line fill operation. A line of data that immediately follows the line of data requested in the cache line fill operation may be speculatively loaded into the prefetch buffer.

According to another aspect of the invention, a method is provided for supplying data to a processor in a digital processing system. The method comprises holding data required by the processor in a cache memory, supplying data from the cache memory to the processor in response to processor requests, performing a cache line fill operation in response to a cache miss, supplying data from a prefetch buffer to the cache memory in response to the cache line fill operation, and speculatively loading data from a lower level memory to the prefetch buffer in response to the cache line fill operation.

According to a further aspect of the invention, a digital processing system is provided. The digital processing system comprises a data requestor for issuing a data request, a prefetch buffer, and control logic for supplying data from the prefetch buffer to the data requester in response to the data request and for speculatively loading data from a memory to the prefetch buffer in response to the data request. A data element that immediately follows the data element requested in the data request may be speculatively loaded into the prefetch buffer.

According to a further aspect of the invention, a digital processing system is provided. The digital processing system comprises a data requester for issuing a data request, a prefetch buffer, and control logic for supplying data from the prefetch buffer to the data requestor in response to the data request and for speculatively loading data from a memory to the prefetch buffer in response to a miss in the prefetch buffer or a hit in the prefetch buffer.

BRIEF DESCRIPTION OF THE DRAWINGS

For a better understanding of the present invention, reference is made to the accompanying drawings, which are incorporated herein by reference and in which:

FIG. 5 is a schematic diagram that illustrates the contents of the prefetch buffer shown in FIG. 3;

DETAILED DESCRIPTION

Figure 1:
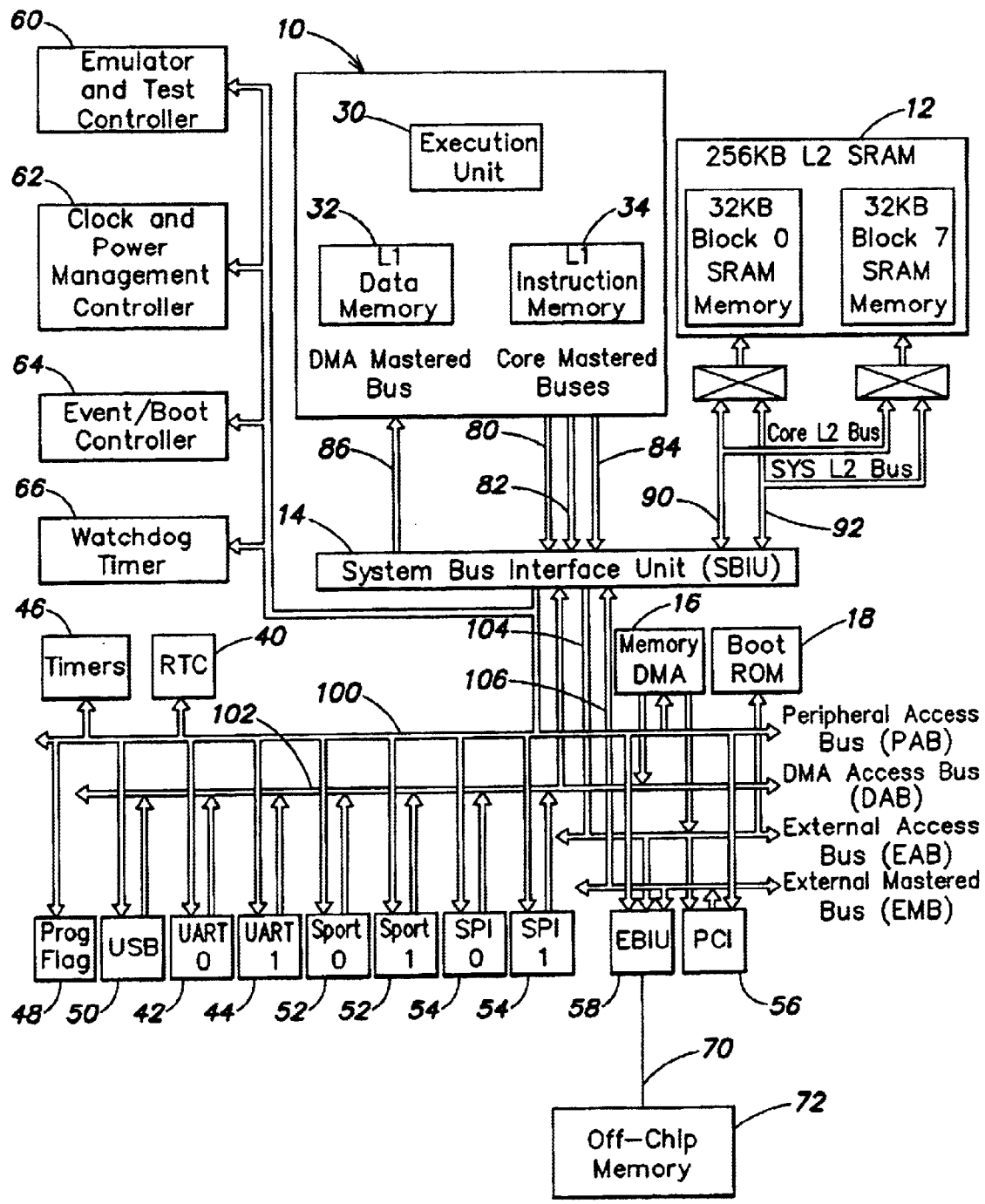
FIG. 1 is a block diagram of a digital signal processor in accordance with an embodiment of the invention.

A digital signal processor in accordance with an embodiment of the invention is shown in FIG. 1. The digital signal processor (DSP) includes a core processor 10, a level 2 (L2)

memory 12, a system bus interface unit (SBIU) 14, a DMA controller 16 and a boot RAM 18. Core processor 10 includes an execution unit 30, a level one (L1) data memory 32 and an L1 instruction memory 34. In some embodiments, L1 data memory 32 may be configured as SRAM or as data cache and L1 instruction memory 34 may be configured as SRAM or as instruction cache. In one embodiment, L1 data memory 32 includes 32K bytes of data SRAM/cache and 4K bytes of data scratchpad SRAM, and L1 instruction memory 34 includes 16K bytes of instruction SRAM/cache. The DSP may further include real time clock 40, UART port 42, UART port 44, timers 46, programmable flags 48, USB interface 50, serial ports 52, SPI ports 54, PCI bus interface 56 and external bus interface unit (EBIU) 58. The DSP may also include an emulator and test controller 60, a clock and power management controller 62, an event/boot controller 64 and a watchdog timer 66.

The digital signal processor may be connected via EBIU 58 and an external bus 70 to an off-chip memory 72. A variety off-chip memory types may be utilized, including but not limited to SDRAM, asynchronous memory, flash memory and the like.

System bus interface unit 14 is connected to core processor 10 by processor buses, which may include data buses 80 and 82, and an instruction bus 84. System bus interface unit 14 is also connected to core processor 10 by a DMA bus 86. System bus interface unit 14 is connected to L2 memory 12 by a first memory bus 90 and a second memory bus 92. System buses, which may include a PAB bus 100, a DAB bus 102, an EAB bus 104 and an EMB bus 106, are connected between system bus interface unit 14 and other components of the digital signal processor.

Figure 2:
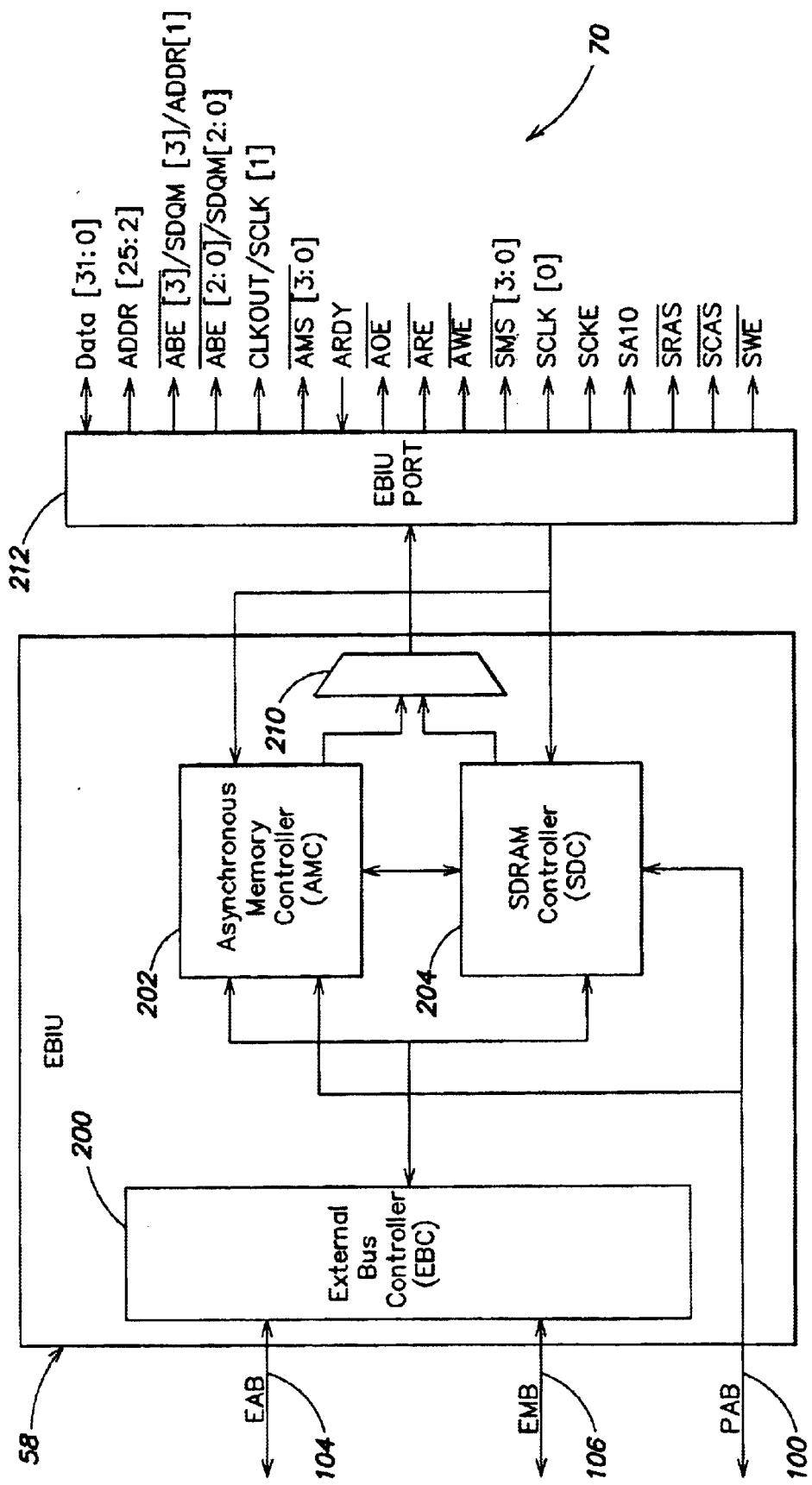
FIG. 2 is a simplified block diagram of the external bus interface unit (EBIU) shown in FIG. 1.

A simplified block diagram of external bus interface unit 58 is shown in FIG. 2. EAB bus 104 and EMB bus 106 are connected to an external bus controller 200. External bus controller 200 is connected to an asynchronous memory controller (AMC) 202 and an SDRAM controller (SDC) 204. PAB bus 100 is connected directly to asynchronous memory controller 202 and SDRAM controller 204. Outputs of AMC 202 and SDC 204 are supplied through a multiplexer 210 to an EBIU port 212. EBIU port 212 is also connected directly to AMC 202 and SDC 204. EBIU port 212 may be connected via bus 70 to off-chip memory 70 (FIG. 1). The data pins for each memory type are multiplexed together at the pins of the digital signal processor. The asynchronous memory controller 202 and the SDRAM controller 204 effectively arbitrate for the shared pin resources. The external access bus (EAB) 104 is mastered by the system bus interface unit 14 on behalf of external bus requests by core processor 10.

During execution of program code, execution unit 30 issues requests to instruction cache memory 34 for instruction code and issues requests to data cache memory 32 for operands. A cache hit occurs when an entry in the respective cache memory matches the address of the request. A cache miss occurs when the requested data is not present in the cache memory. In the case of a cache miss, a cache line fill operation is performed to request the data from off-chip memory 72 and to return the data to the cache memory for use by execution unit 30. Typically, an entire cache line is returned from memory 72 in the cache line fill operation. The cache line fill operation may have a latency of many clock cycles during which the execution unit 30 is stalled waiting for data. As used herein, the term "data" includes operands, instructions and any other type of information in digital form.

According to an aspect of the invention, SDRAM controller 204 includes components, including a prefetch buffer and control logic, which perform speculative reads from off-chip memory 72 in response to cache line fill operations. The speculative read is a read request that is not based on a specific request by execution unit 30 but instead is based on known characteristics of typical program operation. In a preferred embodiment, the speculative read accesses the next line of data that immediately follows the line of data requested in the cache line fill operation. This embodiment is based on the sequential accesses to instructions and operands that are typical of program execution. The data returned in response to the speculative read is stored in the prefetch buffer. As described in detail below, the data in the prefetch buffer is accessed when the subsequent cache line fill operation occurs. The subsequent cache line fill operation produces one of three results when the prefetch buffer is accessed. If all the requested data words are valid in the prefetch buffer (present in the prefetch buffer or in the process of being speculatively read from memory 72), a full prefetch buffer hit occurs. If some but not all of the requested data words are valid in the prefetch buffer, a partial prefetch buffer hit occurs. If some or all of the requested data words are present and valid in the prefetch buffer, those data words are returned to the cache memory immediately on consecutive clock cycles. If none of the requested data words are valid in the prefetch buffer, a prefetch buffer miss occurs and the data words are requested from off-chip memory 72. A prefetch buffer hit and a prefetch buffer miss, which involve accesses to the prefetch buffer, are to be distinguished from a cache hit and a cache miss, which involve accesses to the cache memory.

In the case of a full prefetch buffer hit, the cache line fill operation is completed at the maximum possible rate. In the case of a partial prefetch buffer hit, the cache line fill operation is completed with lower latency than a cache line fill to off-chip memory 72. In the case of a prefetch buffer miss, the cache line fill operation accesses off-chip memory 72 and incurs the normal penalty of a cache line fill operation. The prefetch buffer is never detrimental to the latency of memory access, but only improves latency.

As noted above, the speculative read preferably accesses the next line of data that immediately follows the line of data requested in the cache line fill operation. This approach is based on the typical sequential nature of program code and sequential access to data. Sequential access to data is particularly characteristic of DSP applications. As a result, a high prefetch buffer hit rate is achieved.

Figure 3:
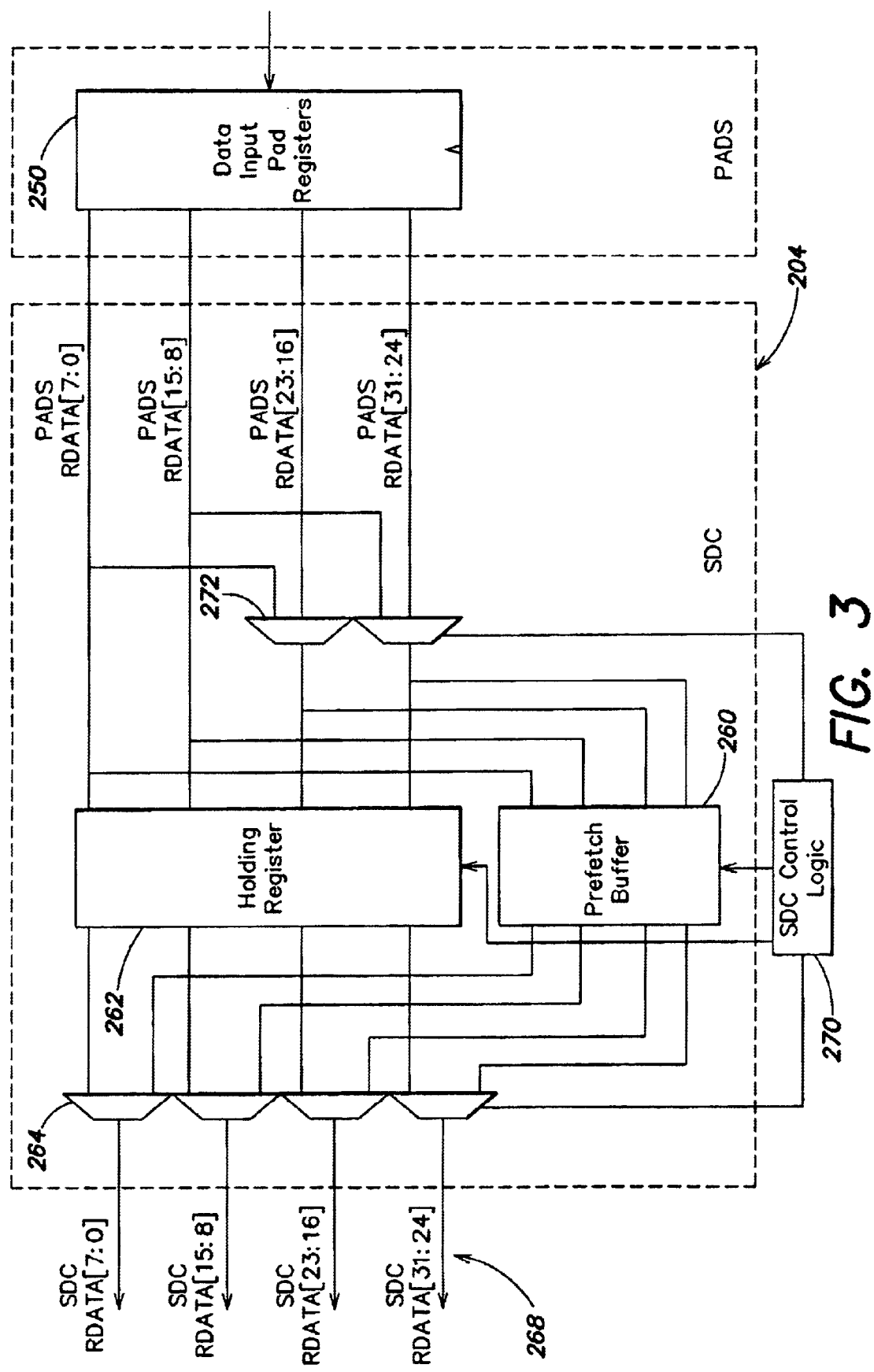
FIG. 3 is a block diagram of a read datapath of the SDRAM controller shown in FIG. 2.
Figure 4:
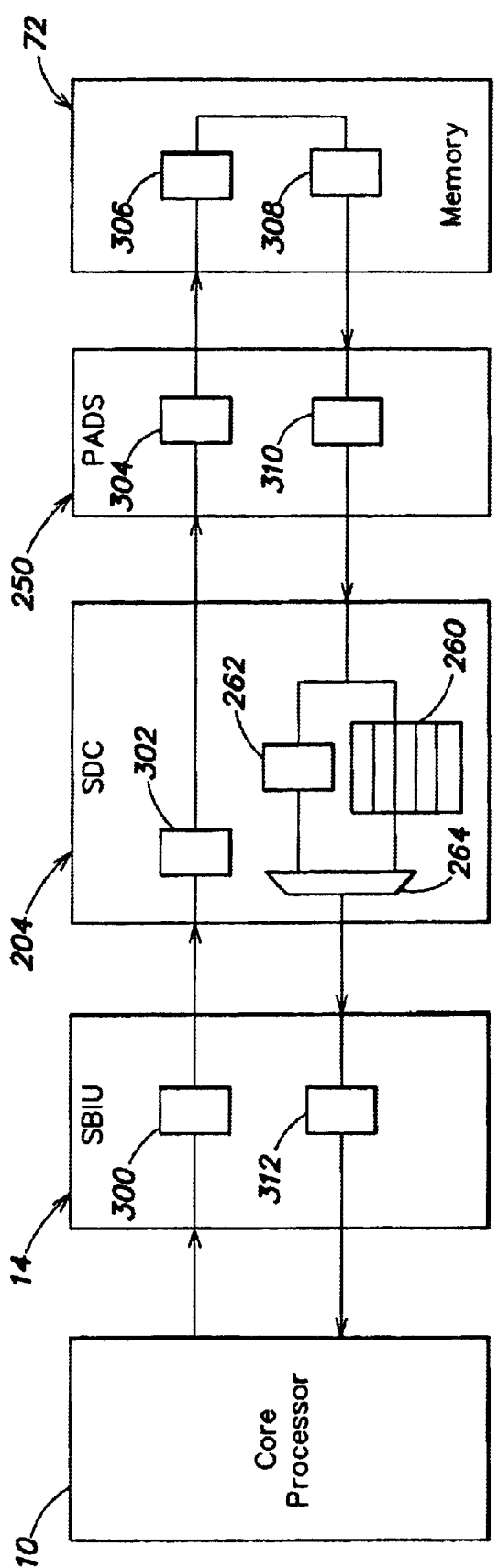
FIG. 4 is a simplified block diagram of components involved in a cache line fill operation in the digital signal processor of FIG. 1.

A read datapath of SDRAM controller 204 is shown in FIG. 3. A schematic diagram of components involved in a cache line fill operation is shown in FIG. 4. As shown in FIG. 4, a cache miss in core processor 10 produces a cache line fill operation in which off-chip memory 72 is accessed. The cache line fill address passes through system bus interface unit 14, SDRAM controller 204 and pad registers 250 to memory 72. The read data from memory 72 is returned through pad registers 250 to SDRAM controller 204. The read data then passes through system bus interface unit 14 to core processor 10.

As shown in FIG. 3, SDRAM controller 204 may include a prefetch buffer 260, a holding register 262, a multiplexer 264 and SDC control logic 270. Prefetch buffer 260 and holding register 262 receive read data from pad registers 250 on read data lines [7:0], read data lines [15:8], read data lines [23:16] and read data lines [31:24]. A multiplexer 272 can route half words from the low order 16-bits of the 32-bit bus to the high order bits of the 32-bit bus in the case of a 16-bit off-chip memory bus. The SDRAM controller 204 can thus operate with off-chip memories having 32-bit data buses and with off-chip memories having 16-bit data buses. Multiplexer 264 selects the output of prefetch buffer 260 or the output of holding register 262 and supplies read data on an internal data bus 268.

The read datapath shown in FIG. 4 preferably has a pipeline architecture. In particular, a read datapath pipeline includes pipeline stage 300 in SBIU 14, a pipeline stage 302 in SDC 204, a pipeline stage 304 in pad registers 250, pipeline stages 306 and 308 in memory 72, pipeline stage 310 in pad registers 250, holding register 262 or prefetch buffer 260 in SDC 204 and pipeline stage 312 in SBIU 14. As known in the art, a memory access request advances through the pipeline stages on consecutive clock cycles, and several operations may be in various states of completion simultaneously. It will be understood that different numbers of pipeline stages can be utilized, depending on the desired performance. In operation, read requests are launched into the pipeline, and the requested data is returned a number of clock cycles later that corresponds to the number of pipeline stages in the read datapath. By way of example, SDC 204 may launch read requests on successive clock cycles and the data is returned on successive clock cycles, beginning on the fifth clock cycle after the first read request was launched. Cache line fill operations are also pipelined, with the pipeline delay depending on the operation of the prefetch buffer as described below.

During program execution, execution unit 30 accesses code in L1 instruction cache memory 34 and data in L1 data cache memory 32. In the event of a cache miss, which indicates that the requested data is not present in the cache memory, a cache line fill operation is initiated. In response to a cache line fill operation, the SDC control logic 270 launches speculative read accesses, or prefetches, in order to minimize the latency seen by the subsequent cache line fill operation. The speculative read accesses locations in memory 72 that correspond to the next cache line following the cache line that was accessed in the cache line fill operation. The read data from the speculative read is stored in prefetch buffer 260. In one embodiment, the cache line fill operation fetches 32 bytes, or 8 words, from memory 72. However, the cache line fill operation is not limited as to the number of words or the word size.

In the subsequent cache line fill operation, prefetch buffer 260 is accessed. If all the words required by the cache line fill operation are stored in prefetch buffer 260 (a full prefetch buffer hit), data from the prefetch buffer 260 starts being returned to core processor 10 on every cycle. In this case, the cache line fill operation is completed at the maximum possible rate. If some but not all of the data words required by the cache line fill operation are stored in prefetch buffer 260 (a partial prefetch buffer hit), data from the prefetch buffer 260 starts being returned to core processor 10 on every cycle. At the same time, SDC control logic 270 determines the address of the first word which is not in prefetch buffer 260 and starts to launch requests into the memory pipeline for the missing words. If enough words are present and valid in prefetch buffer 260 to cover the latency of reading the remaining words that were not present and valid in the prefetch buffer 260, the maximum throughput is achieved. If there are not enough prefetch buffer hits to cover the latency, wait states are inserted in the cache line fill operation until read data for the missing words is returned from memory 72. However, if any words hit in prefetch buffer 260, the cache line fill operation, even with the insertion of wait states, is faster than a cache line fill operation without the prefetch buffer 260. By way of example, if the memory latency from SDC 204 is 5 clock cycles, the maximum throughput of one word per cycle is achieved if the cache line fill hits at least 5 words in the prefetch buffer 260. When the read accesses for the words that were not in the prefetch buffer 260 complete, the SDC control logic 270 begins launching into the pipeline speculative, or prefetch, reads of the next sequential line in memory 72.

If the cache line fill address does not match any of the addresses of the data in prefetch buffer 260 (a prefetch buffer miss), the prefetch buffer data is invalidated, the accesses required to service the cache line fill operation are launched into the pipeline and then prefetches of the next line begin.

The prefetch buffer 260 may be invalidated if a cache line fill operation misses prefetch buffer 260. In addition, the prefetch buffer 260 may be invalidated in the event of a write operation to any word in the line that is stored in prefetch buffer 260. Furthermore, the prefetch buffer 260 is invalidated if prefetching is disabled as described above.

The cache line fill operation typically starts at the address that missed in the cache memory. This word is referred to as the critical word. For a cache line fill operation to have a partial prefetch buffer hit, the address of the critical word of the line being filled must be in the prefetch buffer 260. When the cache line fill operation accesses prefetch buffer 260, the critical word requested by execution unit 30 is returned first before reading any missing words. Typically, the execution unit 30 is stalled waiting for the critical word. When the critical word is returned to the cache memory, execution unit 30 can resume operation.

If the prefetch buffer 260 waited until all the words of the cache line had been read before returning any data to the cache memory, the execution unit 30 would be stalled for a longer period. Thus, the core processor 10 is not required to wait for the missing words of the cache line to be read from memory 72 before resuming execution.

Certain conditions may preempt the start of a speculative read by SDC control logic 270. It will be understood that the conditions for enabling speculative reads may vary depending on the application. In one example, speculative reads may be enabled or disabled by a bit in a control register. Furthermore, the asynchronous memory controller 202 (FIG. 2) may be given priority over speculative read accesses. In addition, the memory line to be accessed in the speculative read should be in the memory page which is currently open, and no auto-refresh request or self-refresh request should be pending.

In addition, the speculative read may be interrupted under certain conditions, which may vary according to the application. The speculative read continues, unless interrupted, until prefetch buffer 260 is full. The speculative read may be interrupted if the asynchronous memory controller 202 has a pending request and has priority over prefetches. Furthermore, a speculative read access may be interrupted when another SDRAM controller 204 access request occurs, for example, from core processor 10, or an auto-refresh request or self-refresh request occurs.

As noted above, a speculative read, or prefetch, may be interrupted. Also, a subsequent cache line fill operation may occur before the prefetch buffer 260 is filled. Therefore it is possible to have a partially-filled prefetch buffer 260. Words that are successfully prefetched into the prefetch buffer 260 and words that are in the memory pipeline are considered valid words when determining prefetch buffer hits. All valid words which follow the critical word in a line wrapping manner are counted as prefetch buffer hits. For example, the speculative read begins and stores words 7, 0, 1, 2, and 3 into prefetch buffer 260 and then is interrupted. If the critical word of a cache line fill operation is word 3, then only word 3 is a prefetch buffer hit, since word 4 is not valid in the prefetch buffer 260. If the critical word of a cache line fill operation is word 7 in the same prefetch, then all five words in prefetch buffer 260 are prefetch buffer hits. In this case, the maximum throughput of one word per cycle is achieved.

The latency between the time that data is returned by SDC 204 to the cache memory in response to a first cache line fill operation and the time that a second cache line fill request is received by SDC 204 is typically several cycles, for example, 4 clock cycles. This time can be used by SDC 204 to launch speculative reads and to at least partially fill prefetch buffer 260. In many cases, the prefetch buffer 260 is completely filled before the next cache line fill request is received. In the absence of the prefetch buffer 260, SDC 204 would be idle during this period.

In this embodiment, speculative reads are started only in response to a cache line fill operation. The address of the first speculative read is the corresponding address of the current critical word in the next cache line. For example, if a cache line fill operation starts with word 5, then the speculative read starts with word 5 in the following line. By selecting the address of the first speculative read as the address in the next line that corresponds to the address of the critical word in the current line, efficient operation is achieved. Since the current critical word is returned to the cache memory first, prefetch of the corresponding word in the next line can begin immediately thus, permitting transfer of data from prefetch buffer 260 to the cache memory simultaneously with transfer of data from memory 72 to prefetch buffer 260.

In summary, in the case of a full hit in prefetch buffer 260, the full line of data is returned to the cache memory at the same time that speculative reads of the next sequential line of data are launched into the memory pipeline. In the case of a partial hit in prefetch buffer 260, the valid data in prefetch buffer 260 is returned to cache memory 260. At the same time, requests for the missing data are launched into the memory pipeline. Then, speculative reads of the next sequential line of data are launched into the memory pipeline. In the case of a miss in prefetch buffer 260, requests for the data to service the cache line fill are launched into the memory pipeline and then speculative reads of the next sequential line of data are immediately launched into the memory pipeline.

Figure 5:
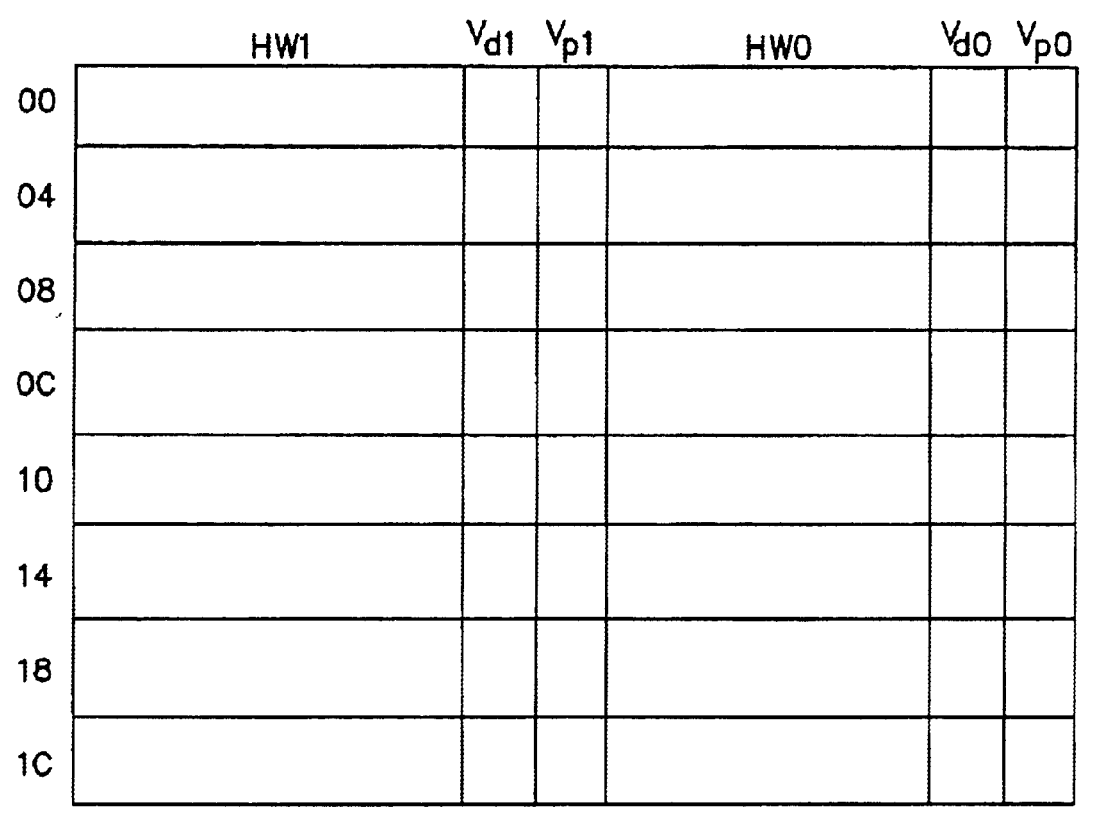

A schematic diagram of the contents of prefetch buffer 260 in accordance with one embodiment is shown in FIG. 5. As shown, prefetch buffer 260 may contain 8 words, which correspond to 16 half words or 32 bytes. Each half word may have two valid bits. A prefetch valid bit ($V_{p0}$ and $V_{p1}$) may be set when a prefetch operation has been launched into the memory pipeline and is in process for the corresponding half word. When the prefetch valid bit is set, the cache line fill operation registers a hit even though the requested data word may not yet have been returned to prefetch buffer 260. A data valid bit ($V_{d0}$ and $V_{d1}$) may be set when the data for the corresponding half word arrives in prefetch buffer 260 and is ready to be sent to the cache memory. The data valid bit may represent a data acknowledge signal in data transfers from the prefetch buffer 260 to the cache memory. In this embodiment, prefetch buffer 260 has the capacity to hold one cache line. It will be understood that the prefetch buffer 260 may have different capacities, different valid bits and different valid bit protocols within the scope of the invention.

Figure 6:
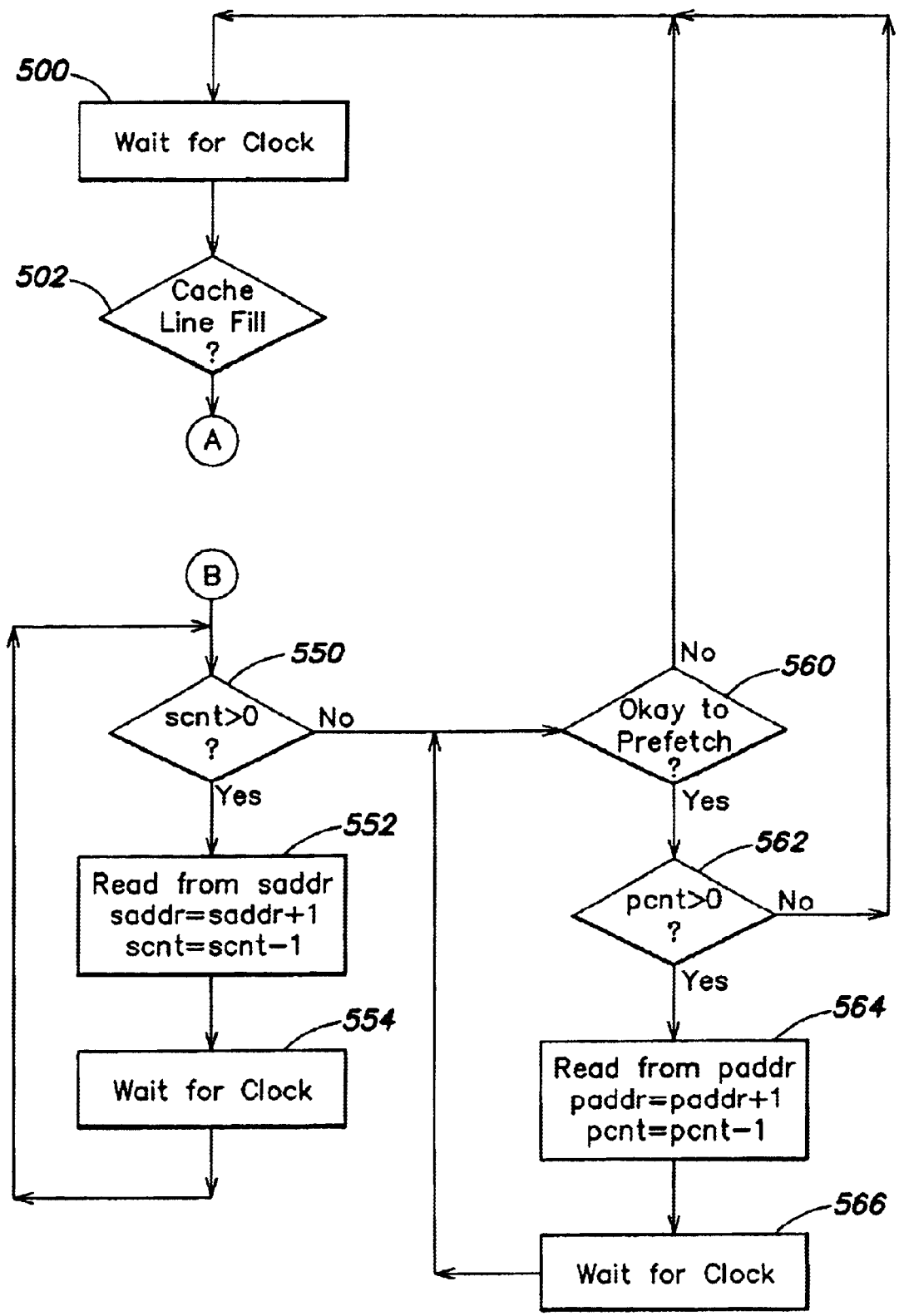
FIG. 6 is a flow diagram of control logic for servicing a cache line fill operation and for prefetching the next line, in accordance with an embodiment of the invention.
Figure 7:
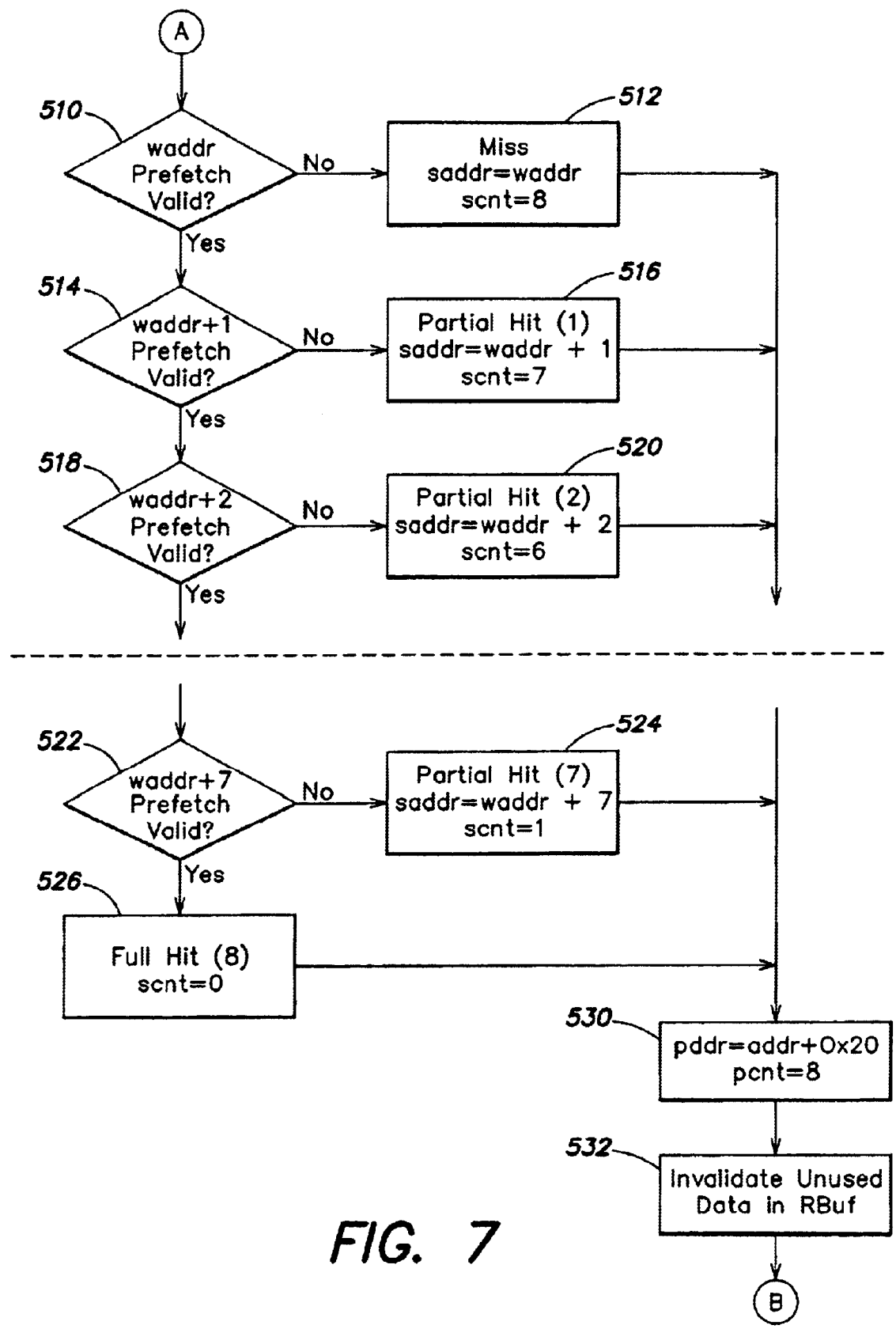
FIG. 7 is a flow diagram of control logic for determining whether a prefetch buffer hit has occurred and how many reads are required for completing the cache line fill operation, in accordance with an embodiment of the invention.

A flow chart of a process executed by SDC control logic 270 in responding to a cache line fill operation and prefetching data from memory 72 is shown in FIGS. 6 and 7. Initially, the process waits for a clock edge in step 500. If a cache line fill operation is underway, as determined in step 502, the process proceeds to step 510 (FIG. 7). In FIGS. 6 and 7, the cache line fill address is represented by "addr," or "addr[31:0]," and the word address within the cache line is represented by "waddr" or "addr[4:2]." A service address is represented by "saddr" and a service count is represented by "sent." The prefetch address is represented by "paddr," and a prefetch count is represented by "pcnt."

Referring again to FIG. 7, a determination is made in step 510 as to whether the cache line fill address is valid in the prefetch buffer 260. A data word is "valid" in prefetch buffer 260 if the data valid bit is set, indicating that the data word is present in prefetch buffer 260, or if the prefetch valid bit is set, indicating that the data word is in the process of being returned from memory 72. If the requested word is not valid in prefetch buffer 260, indicating a prefetch buffer miss, the service address is set equal to the word address and the service count is set equal to 8 in step 512, thus indicating that 8 words of the cache line fill must be fetched from memory 72. If the critical word requested by the cache line fill operation is valid in prefetch buffer 260, a determination is made in step 514 as to whether the second word of the cache line fill operation is valid in prefetch buffer 260. If the second word of the cache line fill operation is not valid in the prefetch buffer 260, a partial hit of one word occurs. The service address is set equal to the word address plus 1, and the service count is set equal to 7 in step 516, thus indicating that 7 words of the cache line fill must be fetched from memory 72. Similarly, the third word of the cache line fill operation is tested in step 518 and a partial hit of 2 words occurs if the third word is not valid in prefetch buffer 260. In step 520, the service address is set to the word address plus 2 and the service counter is set to 6. In a similar manner, a determination is made as to whether each word of the cache line fill is valid in prefetch buffer 260. Testing of the fourth through seventh words of the cache line fill operation is omitted from FIG. 7 for simplicity of illustration. In step 522, a determination is made as to whether the eighth word of the cache line fill operation is valid in prefetch buffer 260. If the eighth word is not valid, a partial hit of 7 words occurs. The service address is set to the word address plus 7 and the service count is set to 1 in step 524. If a determination is made in step 522 that the eighth word is valid in prefetch buffer 260, a full hit occurs and the service counter is set to 0 in step 526. Each of steps 512, 516, 520, . . . 524 and 526 proceeds to step 530. In step 530, the prefetch address is set to the cache line fill address plus 8 words and the prefetch count is set to 8. In step 532, unused data in the prefetch buffer 260 is invalidated. The process then proceeds to step 550 (FIG. 6).

In step 550, a determination is made as to whether the service count is greater than 0. If the service count is greater than 0, indicating that one or more words of the cache line fill operation were not present in prefetch buffer 260, the process proceeds to step 552. In step 552, SDC control logic 270 initiates a read from memory 72 at the current value of the service address. In one embodiment, the data word returned from memory 72 is placed in prefetch buffer 260 if the service count has a value of 1–7, indicating a partial prefetch buffer hit and is placed in holding register 262 if the service count has a value of 8, indicating a full prefetch buffer miss. In another embodiment, the data word returned from memory 72 is placed in prefetch buffer 260 in the case of a partial prefetch buffer hit or a prefetch buffer miss. In addition, the service address is incremented by 1 and the service count is decremented by 1 in step 552. The process waits for a clock edge in step 544 and then returns to step 550. The loop including steps 550, 552 and 554 is repeated until requests for all the data words that missed in prefetch buffer 260 have been launched into the memory pipeline.

If the service count is determined in step 550 to be equal to 0, indicating that all data words for the cache line fill operation were either present in the prefetch buffer 260 or are in the process of being returned from memory 72, the process proceeds to step 560 to begin a prefetch operation. In step 560, a determination is made as to whether a prefetch operation can proceed. Examples of conditions for proceeding are given above. For example, an auto-refresh request or a self-refresh request may preempt a prefetch operation. Different conditions for enabling a prefetch operation may be established within the scope of the invention. If a prefetch operation cannot proceed, the process returns to step 500 to wait for the next clock edge. If a determination is made in step 560 that the prefetch operation can proceed, the process proceeds to step 562. In step 562, a determination is made as to whether the prefetch count is greater than 0. If the prefetch count is greater than 0, a data word is requested from the prefetch address in step 564 and the read data will be returned to prefetch buffer 260. In addition, the prefetch address is incremented by 1 and the prefetch count is decremented by 1 in step 564. The process then proceeds to step 566 to wait for a clock edge. When a clock edge is received, the process returns to step 560. The loop including steps 560, 562, 564 and 566 is repeated until the prefetch operation is complete and the prefetch buffer 260 is full or the prefetch operation has been interrupted as described above. When the prefetch count reaches 0, as determined in step 562, the process returns to step 500. Prefetch buffer 260 is now filled with the next line of data following the line that was accessed in the cache line fill operation and is available to service the next cache line fill operation.

Figure 8:
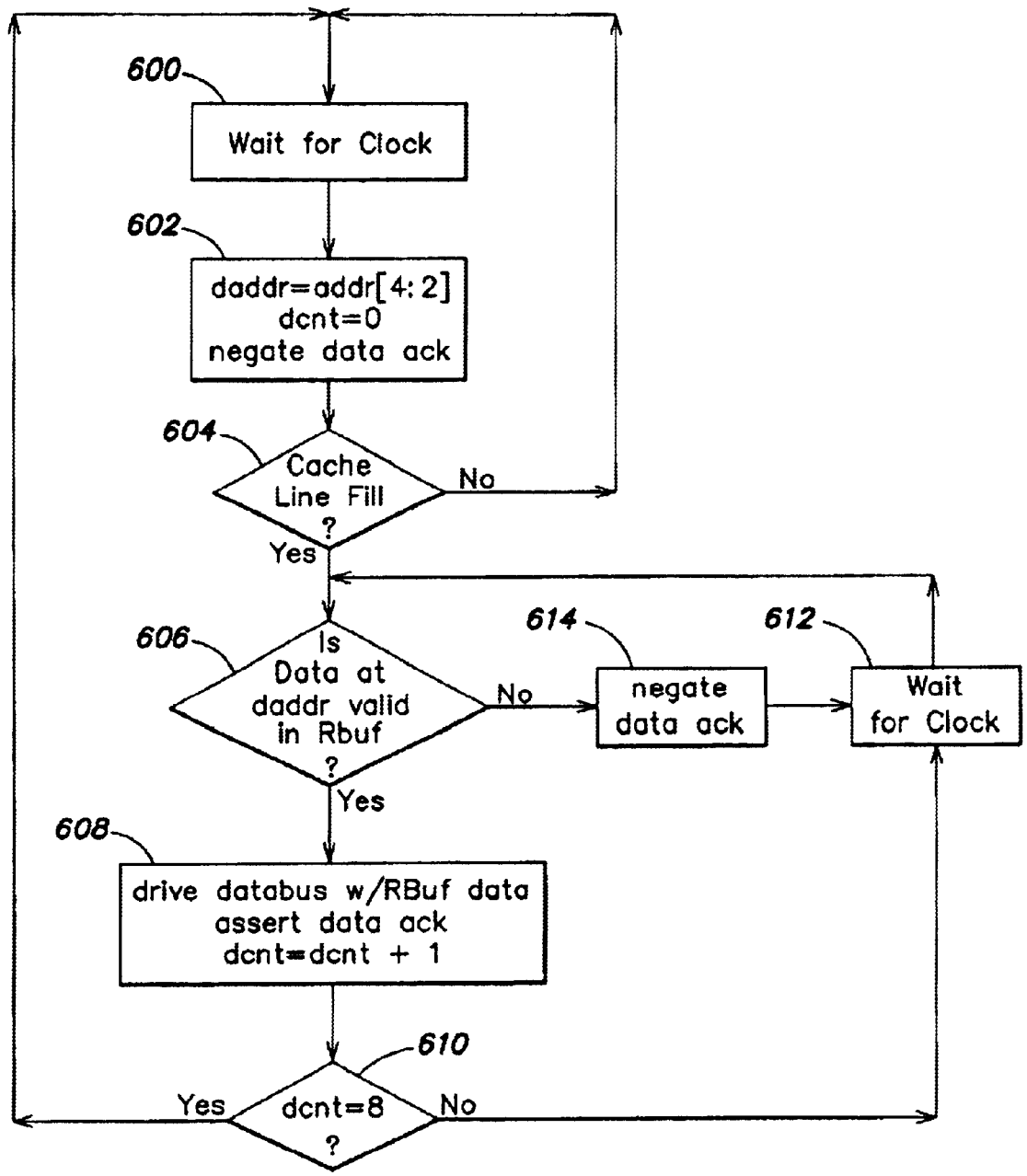
FIG. 8 is a flow diagram of control logic for transferring data from the prefetch buffer to the internal data bus of the digital signal processor, in accordance with an embodiment of the invention.

An embodiment of a process executed by SDC control logic 270 for transferring data to internal data bus 268 is shown in FIG. 8. In step 600, the process waits for a clock edge. In step 602, a data address, daddr, is set equal to the word address of the cache line fill address, addr[4:2]. Also in step 602, a data count, dcnt, is set equal to zero and a data acknowledge signal is negated. In step 604, a determination is made as to whether the transfer request is a cache line fill operation. If the transfer request is not a cache line fill operation, the process returns to step 600. When the transfer request is determined in step 604 to be a cache line fill operation, the process proceeds to step 606. In step 606, a determination is made as to whether the data at the data address is present and valid in the prefetch buffer 260. If the data at the data address in the prefetch buffer 260 is present and valid, the process proceeds to step 608. In step 608, the internal data bus 268 is driven with the prefetch buffer data. In addition, the data acknowledge signal is asserted and the data count is incremented by one. In step 610, a determination is made as to whether the data count is equal to 8. If the data count is equal to 8, the cache line fill operation is complete and the process returns to step 600. If the data count is not equal to 8, the process proceeds to step 612 and waits for a clock edge. On the next clock edge, the process returns to step 606. If the data at the data address in prefetch buffer 260 is determined in step 606 not to be present and valid, the data acknowledge signal is negated in step 614 and the process proceeds to step 612 to wait for a clock edge. A loop including steps 606, 608, 610 and 612 is executed multiple times to transfer the words of the cache line fill operation from prefetch buffer 260 to the cache memory.

Figure 9:
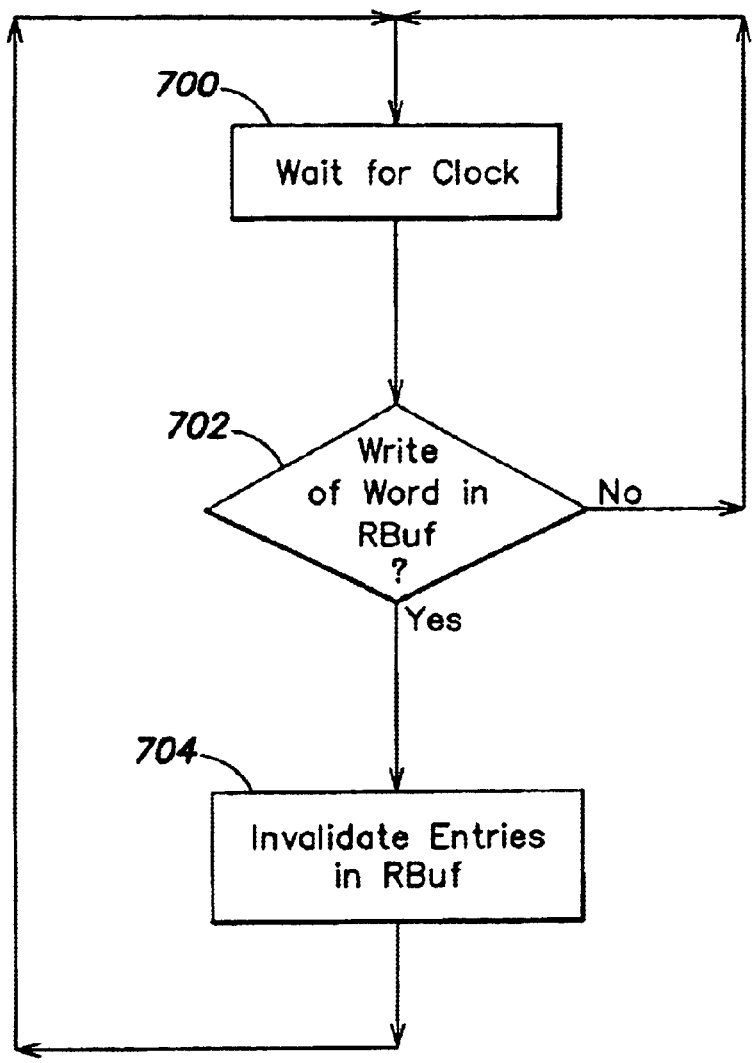
FIG. 9 is flow diagram of control logic for invalidating the prefetch buffer on a write access to an address in the prefetch buffer, in accordance with an embodiment of the invention.

An embodiment of a process executed by SDC control logic 270 for invalidating prefetch buffer 260 on a write access to an address in prefetch buffer 260 is shown in FIG. 9. In step 700, the process waits for a clock edge. In step 702, a determination is made as to whether a write access has occurred to a word currently in prefetch buffer 260. If a write access to a word in prefetch buffer 260 has occurred, the entries in prefetch buffer 260 are invalidated in step 704. The process then returns to step 700. When a write access to a word in prefetch buffer 260 has not occurred, no action is taken and the process returns to step 700. In another embodiment, only the data word in prefetch buffer 260 that is affected by the write access is invalidated. In a further embodiment, the data word in prefetch buffer that is affected by the write access is updated to reflect the value being written to memory 72. This routine avoids any discrepancy between data in memory 72 and data in prefetch buffer 260.

Figure 10:
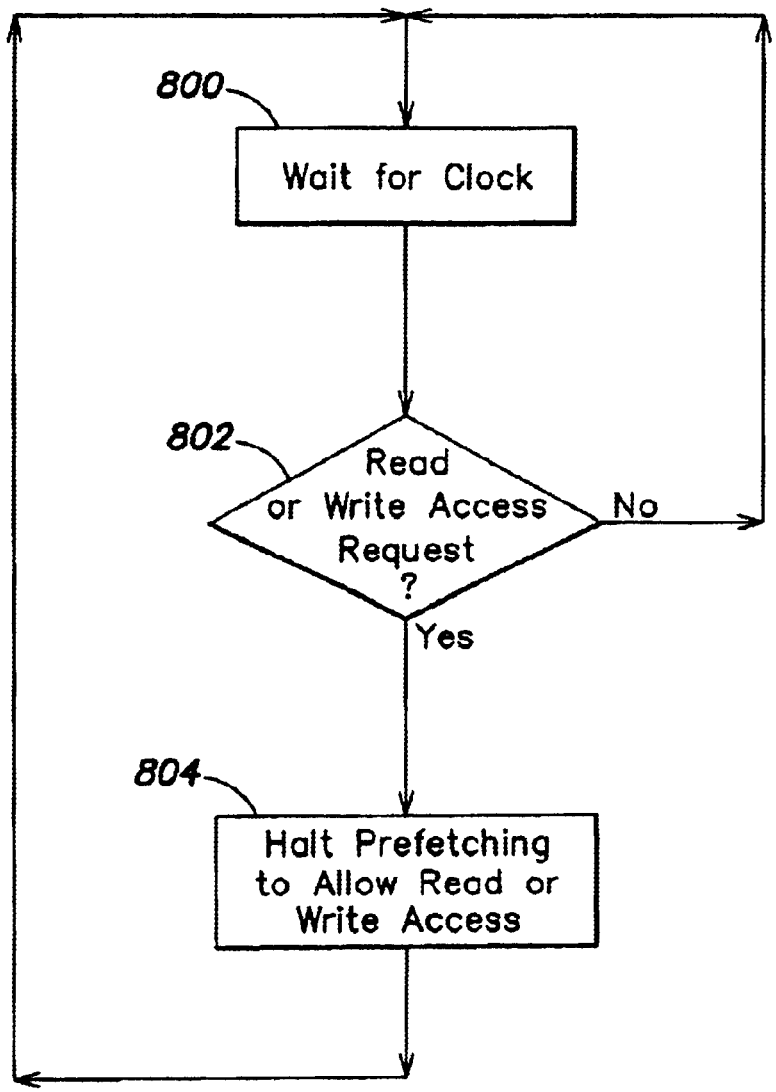
FIG. 10 is a flow diagram of control logic for halting prefetching when a read or write request occurs, in accordance with an embodiment of the invention.

An embodiment of a process executed by SDC control logic 270 for halting prefetching when a read or write request occurs is shown in FIG. 10. In step 800, the process waits for a clock edge. In step 802, a determination is made as to whether a read or write access request has occurred. If a read or write request has occurred, prefetching of data from memory 72 to prefetch buffer 260 is halted in step 804 to allow the read or write access. When prefetching is halted in step 804, prefetch read requests that have been launched into the memory pipeline will complete and the requested data will be returned. However, no new prefetch read requests will be launched into the pipeline. If a read or write access request has not occurred, the process returns to step 800 and no action is taken. The routine of FIG. 10 insures that the prefetching operation does not delay read or write access requests by other system elements.

Figure 11:
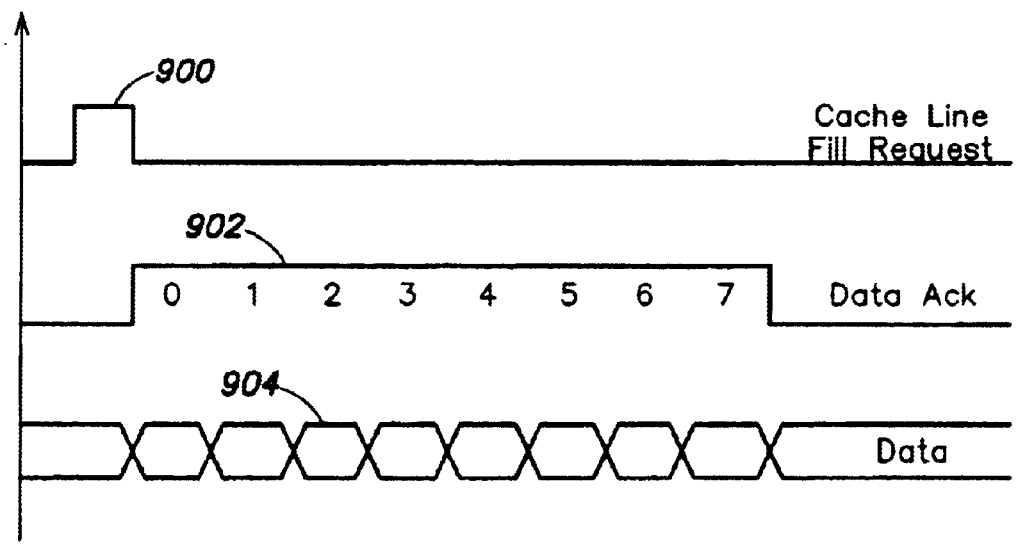
FIG. 11 is a timing diagram that illustrates a cache line fill operation in the case of a full hit in the prefetch buffer.

A timing diagram that illustrates a first example of a cache line fill operation in accordance with the invention is shown in FIG. 11. A waveform 900 represents a cache line fill request. A waveform 902 represents a data acknowledge signal, and a waveform 904 represents data on the internal data bus 268. The data is returned from prefetch buffer 260 to the cache memory. As shown, data words 0–7 are returned on consecutive clock cycles following the cache line fill request. The example of FIG. 11 may correspond to the case of a full hit in prefetch buffer 260. In this case, all 8 words of the cache line fill operation are present and valid in prefetch buffer 260. FIG. 11 may also represent the case of a partial hit, where prefetch buffer 260 contains a sufficient number of requested data words to hide the latency associated with fetching the remaining data words from memory 72. That is, by the time the valid data words in prefetch buffer 260 have been transferred to the cache memory, the remaining data words are being fetched from memory 72 and are available in prefetch buffer 260 on consecutive clock cycles.

Figure 12:
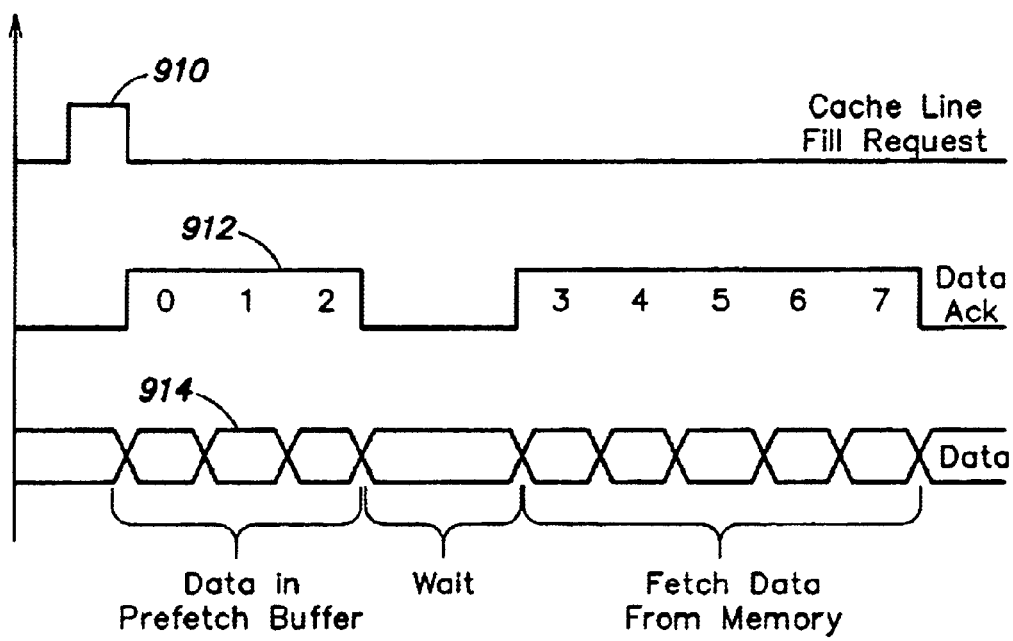
FIG. 12 is a timing diagram that illustrates a cache line fill operation in the case of a partial hit in the prefetch buffer.

A timing diagram that illustrates a second example of a cache line fill operation is shown in FIG. 12. A waveform 910 represents a cache line fill request. A waveform 912 represents a data acknowledge signal, and a waveform 914 represents data on the internal data bus 268. As shown, data words 0, 1 and 2 were present and valid in prefetch buffer 260. Remaining data words 3–7 are fetched from memory 72 and are returned to prefetch buffer 260. In this case, wait cycles are required between data word 2 and data word 3 because of the 5 clock cycle latency in fetching data from memory 72.

Figure 13:
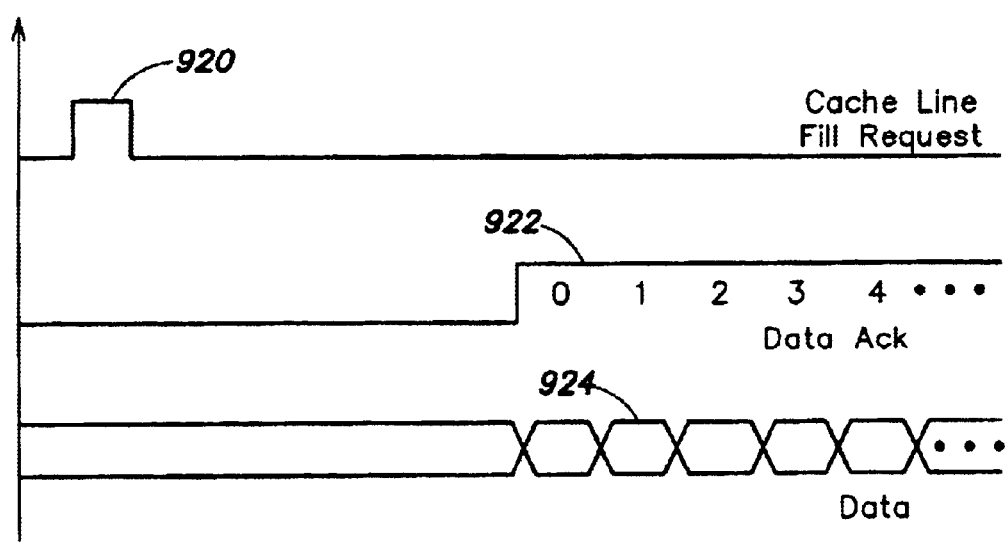
FIG. 13 is a timing diagram that illustrates a cache line fill operation in the case of a miss in the prefetch buffer.

A timing diagram that illustrates a third example of a cache line fill operation as shown in FIG. 13. A waveform 920 represents a cache line fill request. A waveform 922 represents a data acknowledge signal, and a waveform 924 represents data on the internal bus 268. In this case, none of the data words of the cache line fill operation were valid in prefetch buffer 260 (prefetch buffer miss). Accordingly, all 8 words are fetched from memory 72. In this case, there is a 5 clock cycle latency before the first word is returned from memory 72.

The prefetch buffer and its operation have been described thus far in connection with a cache line fill operation by core processor 10. In another application, the prefetch buffer is used to service DMA requests. DMA requests typically transfer blocks of data in bursts of 8 or 16 words, for example. The DMA transfer is usually sequential from the beginning to the end of the block of data. Accordingly, a DMA burst request can be used to initiate a speculative read of the next burst following the currently requested burst. The data is returned to the prefetch buffer and is available to service the subsequent DMA burst request. In general, core processor 18 and a DMA controller can be viewed as data requesters which issue data requests that are serviced by the prefetch buffer and associated control logic.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A digital processing system comprising:
   a processor for executing instructions;
   a cache memory system, including a cache memory, for holding data required by the processor and for performing a cache line fill operation in response to a cache miss;
   a prefetch buffer; and
   control logic for supplying data from the prefetch buffer to the cache memory in response to the cache line fill operation and for speculatively loading data from a lower level memory to the prefetch buffer in response to the cache line fill operation, wherein the control logic is configured to return data in the prefetch buffer to the cache memory in response to a partial hit in the prefetch buffer and to request missing data from the lower level memory in response to the partial hit in the prefetch buffer.

2. A digital processing system as defined in claim 1, wherein the control logic returns a full line of data to the cache memory in response to a full hit in the prefetch buffer.

3. A digital processing system as defined in claim 1, wherein the control logic is configured to request a cache line from the lower level memory in response to a miss in the prefetch buffer.

4. A digital processing systems as defined in claim 1, wherein said cache memory is an instruction cache memory and wherein the data corresponds to instruction code.

5. A digital processing system as defined in claim 1, wherein the cache memory is a data cache memory and wherein the data represents operands required by the instructions.

6. A digital processing system as defined in claim 1, wherein the control logic is configured for speculatively loading a line of data that follows the line of data requested in the cache line fill operation.

7. A digital processing system as defined in claim 1, wherein the control logic is configured for simultaneously supplying data from the prefetch buffer to the cache memory and for speculatively loading data from the lower level memory to the prefetch buffer.

8. A digital processing system as defined in claim 1, wherein the prefetch buffer includes a data valid bit associated with each data entry and wherein the control logic is configured for setting the data valid bit when data is speculatively loaded from the lower level memory to the corresponding location in the prefetch buffer.

9. A digital processing system as defined in claim 1, wherein each location in the prefetch buffer has associated therewith a prefetch valid bit which is set when speculative loading is in process for the corresponding prefetch buffer location and a data valid bit which is set when data for the corresponding prefetch buffer location is loaded into the prefetch buffer and is ready to be sent to the cache memory.

10. A digital processing system as defined in claim 9, wherein the data valid bit represents a data acknowledge signal in data transfers from the prefetch buffer to the cache memory.

11. A digital processing system as defined in claim 1, wherein the control logic is configured for speculatively loading data from the lower level memory to the prefetch buffer in response to prefetch buffer hits and prefetch buffer misses during the cache line fill operation.

12. A digital processing system as defined in claim 1, wherein the cache line fill operation requests a critical word first and wherein the control logic is configured to return the critical word from the prefetch buffer to the cache memory before reading missing data from the lower level memory in response to the partial hit.

13. A digital processing system as defined in claim 1, wherein the control logic responds to one or more programmable bits which establish priorities of the speculative load operation with respect to one or more other operations of the digital processing system.

14. A digital processing system as defined in claim 1, wherein the prefetch buffer has a plurality of locations, each of the locations is subdivided into two or more subwords, and each of the subwords has associated therewith one or more valid bits, wherein the prefetch buffer may be utilized with lower level memories having different word widths.

15. A digital processing system as defined in claim 1, wherein the control logic is configured to begin speculatively loading data from the lower level memory before the cache line fill operation is completed.

16. A digital processing system as defined in claim 1, wherein data is supplied from the prefetch buffer to the cache memory at the same time that data is speculatively loaded from the lower level memory to the prefetch buffer.

17. A digital processing system as defined in claim l, wherein the cache line fill operation requests a critical word first and wherein speculative loading of data from the lower level memory begins at a word in a next line of data which corresponds to the critical word in the line of data requested in the cache line fill operation.

18. A digital processing system as defined in claim 9, wherein a prefetch buffer hit is determined for each prefetch buffer location that has the data valid bit set or the prefetch valid bit set.

19. A digital processing system as defined in claim 1, wherein the prefetch buffer has a capacity of one cache line of the cache memory.

20. A method for supplying data to a processor in a digital processing system, comprising:
   holding data required by the processor in a cache memory;

supplying data from the cache memory to the processor in response to processor requests;

performing a cache line fill operation in response to a cache miss;

supplying data from a prefetch buffer to the cache memory in response to the cache line fill operation, wherein the step of supplying data from the prefetch buffer comprises returning data in the prefetch buffer to the cache memory in response to a partial hit in the prefetch buffer and requesting missing data from the lower level memory in response to the partial hit in the prefetch buffer; and speculatively loading data from a lower level memory to the prefetch buffer in response to the cache line fill operation.

21. A method as defined in claim 20, wherein the step of supplying data from the prefetch buffer comprises returning a full line of data to the cache memory in response to a full hit in the prefetch buffer.

22. A method as defined in claim 20, wherein the step of supplying data from the prefetch buffer comprises requesting a cache line from the lower level memory in response to a miss in the prefetch buffer.

23. A method as defined in claim 20, wherein speculatively loading data from the lower level memory comprises speculatively loading a line of data that follows the line of data requested in the cache line fill operation.

24. A method as defined in claim 20, wherein the steps of supplying data from the prefetch buffer and speculatively loading data from the lower level memory are performed at the same time.

25. A method as defined in claim 20, wherein each separately accessible location in the prefetch buffer has associated therewith a prefetch valid bit that is set when speculative loading is in process and a data valid bit which is set when data has been returned from the lower level memory to the prefetch buffer.

26. A method as defined in claim 25, wherein the data valid bit represents a data acknowledge signal in data transfers from the prefetch buffer to the cache memory.

27. A method as defined in claim 20, wherein data is speculatively loaded from the lower level memory to the prefetch buffer in response to prefetch buffer hits and prefetch buffer misses during the cache line fill operation.

28. A method as defined in claim 20, wherein the cache line fill operation requests a critical word first and wherein the critical word is returned from the prefetch buffer to the cache memory before reading missing data from the lower level memory in response to the partial hit.

29. A method as defined in claim 20, wherein data is speculatively loaded from the lower level memory to the prefetch buffer in response to one or more programmable bits which establish priorities of the speculative load operation with respect to one or more other operations of the digital processing system.

30. A method as defined in claim 20, wherein speculative loading of data from the lower level memory is started before the cache line fill operation is completed.

31. A method as defined in claim 20, wherein data is supplied from the prefetch buffer to the cache memory at the same time that data is speculatively loaded from the lower level memory to the prefetch buffer.

32. A method as defined in claim 20, wherein the cache line fill operation requests a critical word first and wherein speculative loading begins at a word in a next line of data which corresponds to the critical word in the line of data requested in the cache line fill operation.

33. A method as defined in claim 25, wherein the step of supplying data from the prefetch buffer to the cache memory comprises determining a prefetch buffer hit for each location in the prefetch buffer that has the prefetch valid bit or the data valid bit set.

34. A digital processing system comprising:

a data requestor for issuing a data request;

a prefetch buffer; and control logic for supplying data from the prefetch buffer to the data requestor in response to the data request and for prefetching data from a memory to the prefetch buffer in response to the data request, wherein the control logic is configured to return data in the prefetch buffer to the data requestor in response to a partial hit in the prefetch buffer and to request missing data from the memory in response to the partial hit in the prefetch buffer.

35. A digital processing system as defined in claim 36, wherein the control logic is configured for speculatively loading data element that immediately follows a data element requested in the data request.

36. A digital processing system as defined in claim 34, wherein the control logic is configured to request data from the memory in response to a miss in the prefetch buffer.

* * * * *

UNITED STATES PATENT AND TRADEMARK OFFICE
CERTIFICATE OF CORRECTION

PATENT NO.    : 6,895,475 B2
DATED         : May 17, 2005
INVENTOR(S)   : Thomas A. Volpe et al.

It is certified that error appears in the above-identified patent and that said Letters Patent is hereby corrected as shown below:

Column 14,
Line 39, "claim 36" should be replace by -- claim 34 --.

Signed and Sealed this

Nineteenth Day of July, 2005

JON W. DUDAS
*Director of the United States Patent and Trademark Office*

UNITED STATES PATENT AND TRADEMARK OFFICE
CERTIFICATE OF CORRECTION

PATENT NO. : 6,895,475 B2 Page 1 of 1
APPLICATION NO. : 10/261263
DATED : May 17, 2005
INVENTOR(S) : Thomas A. Volpe et al.

It is certified that error appears in the above-identified patent and that said Letters Patent is hereby corrected as shown below:

On the Title Page, line 6 of the Abstract, "chache" should be replaced by --cache--.

Signed and Sealed this

Tenth Day of July, 2007

JON W. DUDAS
*Director of the United States Patent and Trademark Office*